April 25, 1933. E. E. GREVE 1,906,004
LUBRICATING SYSTEM FOR PUMPING POWER
Filed April 3, 1931 2 Sheets-Sheet 1
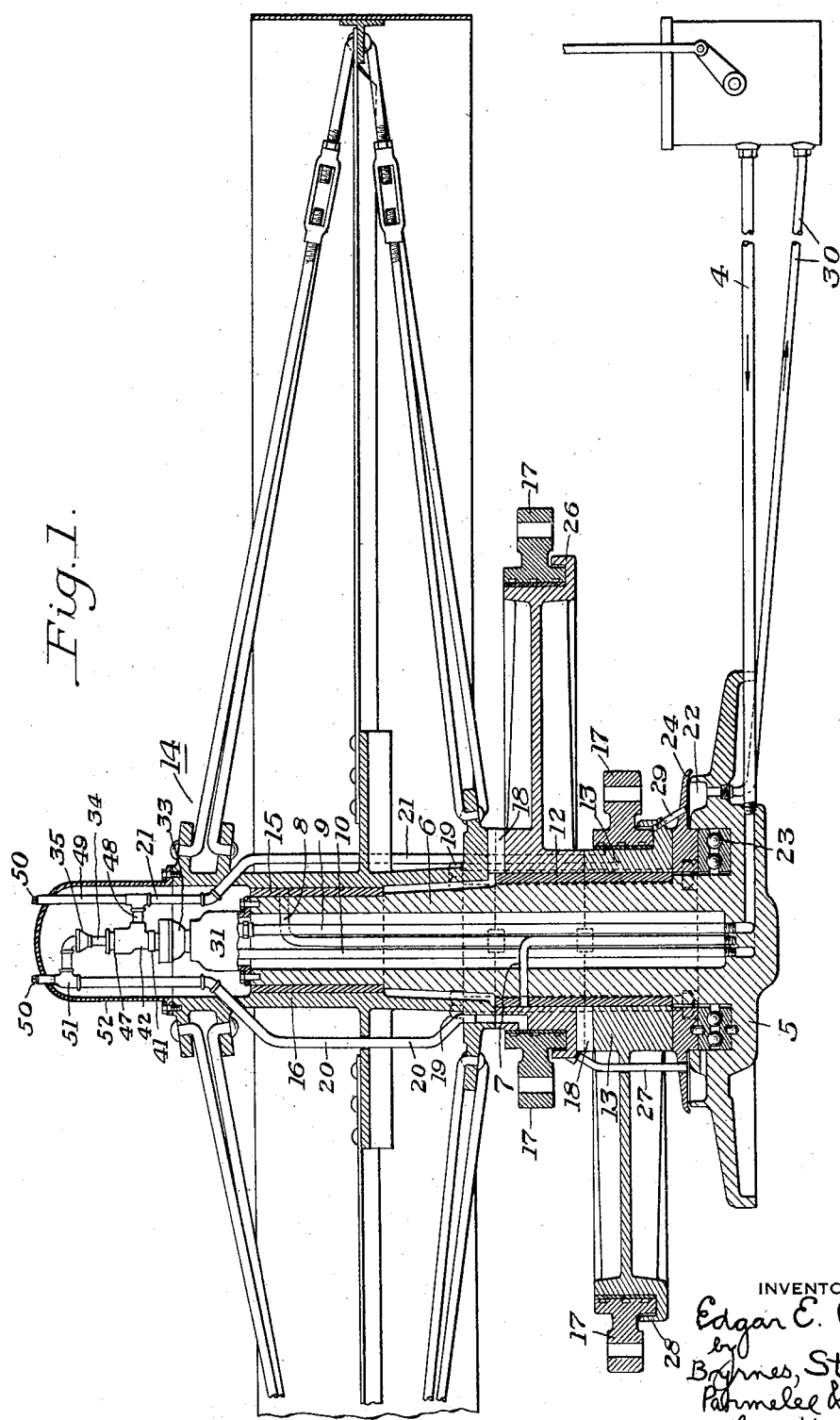
INVENTOR
Edgar E. Greve
by Byrnes, Stebbins
Parmelee & Blenko
his attorneys

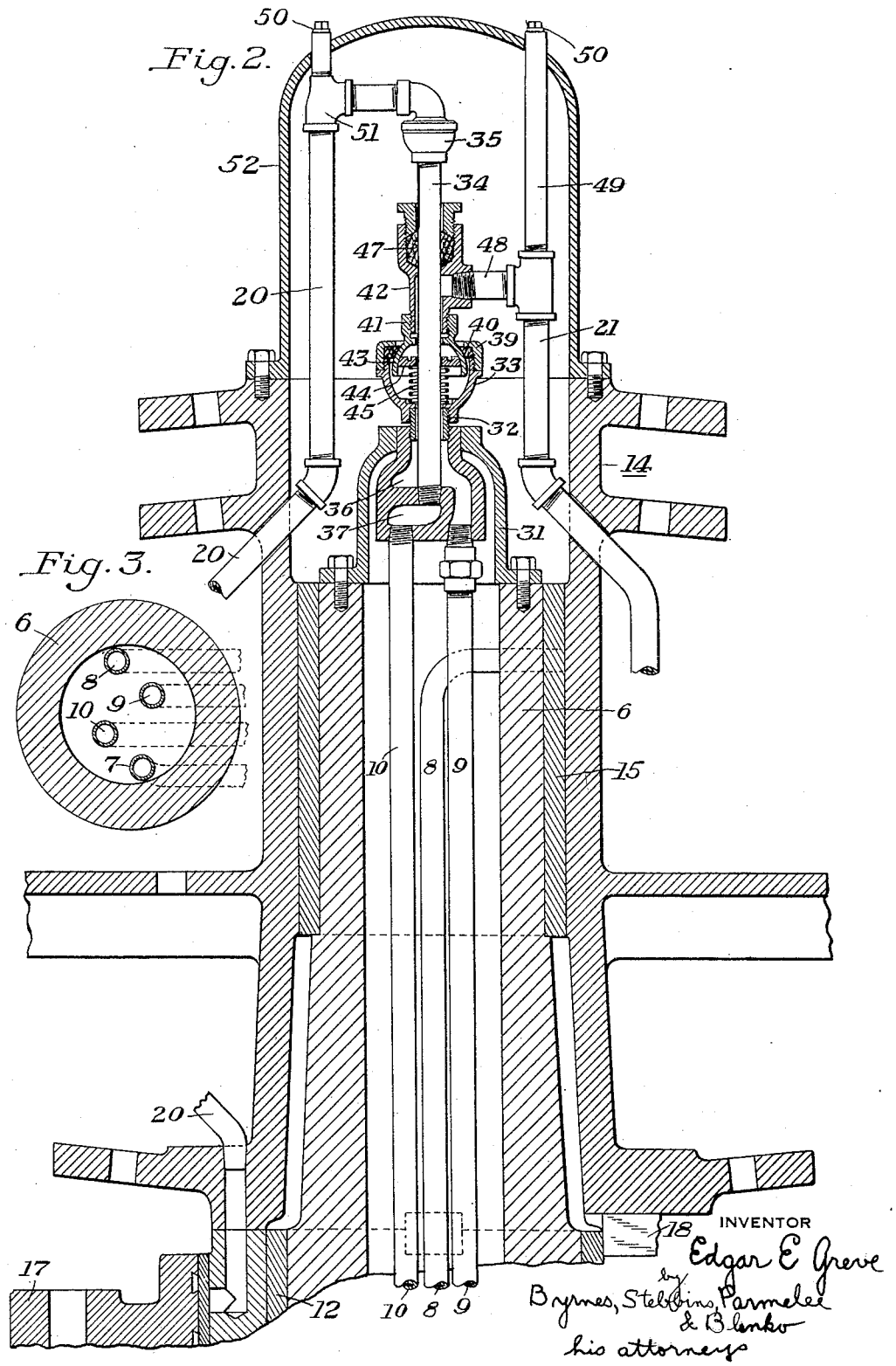

Patented Apr. 25, 1933

1,906,004

UNITED STATES PATENT OFFICE

EDGAR E. GREVE, OF BELLEVUE, PENNSYLVANIA, ASSIGNOR TO OIL WELL SUPPLY COMPANY, OF OIL CITY, PENNSYLVANIA, A CORPORATION OF NEW JERSEY

LUBRICATING SYSTEM FOR PUMPING POWER

Application filed April 3, 1931. Serial No. 527,439.

This invention relates to the lubrication of moving parts of a pumping power. Such apparatus is intended to operate pumping jacks connected to the pumps which lift oil or water from a lower level. In most cases in which powers have been supplied with means for lubricating the same, gravity feed of lubrication has been resorted to, the lubricant being applied to the uppermost parts of the power and working its way down by gravity through the remaining parts of the power which are to be lubricated. Where heavy oil is used for lubricating purposes, parts of the bearing surfaces are not properly lubricated. Moreover, in cold weather the lubricant tends to stiffen so that it does not flow properly to all parts of the bearing surfaces.

It is one object of the present invention to provide ample lubrication for the moving parts of a pumping power. A further object of this invention is to supply lubricant under pressure to the moving parts of a pumping power, thus insuring positive lubrication.

In the accompanying drawings in which, not as limiting my invention but merely for purposes of illustrating the same, I have shown one embodiment which the same may assume, Fig. 1 is a central vertical section through the axis of a pumping power arranged to be lubricated in accordance with the principles of my invention;

Fig. 2 is a detail showing on an enlarged scale a portion of the mechanism shown in Fig. 1;

Fig. 3 is a horizontal sectional view showing the arrangement of the lubricant conduits in the bearing member.

In the usual design of pumping powers, the lubricator is actuated by some revolving part of the power; and either the lubricator itself or the actuating member therefor is carried by a moving part of the power. This means that the lubricator is inaccessible at all times when the power is in operation. My improved arrangement for lubricating a pumping power makes it possible to repair or adjust the lubricator without shutting down the power. This is accomplished in accordance with my invention by locating the lubricator on the outside of the moving parts of the power and operating the lubricator from a motive source independent of the power itself. In Fig. 1 of the drawings the conduit 4 is one of a plurality of independent conduits which supply lubricant to moving parts of the pumping power. As shown in the drawings, these conduits enter the base 5 of the stationary bearing member 6. The portions of the conduits which extend vertically through the bearing member 6 are numbered respectively 7, 8, 9 and 10. The conduit 7 leads directly to the bushing 12 which provides a journal for the lower portion 13 of the rotatable member 14 which is journalled on the bearing member 6. The conduit 8 leads directly to the bushing 15 on which the upper portion 16 of the rotatable member 14 is journalled. This upper portion 16 may be a band wheel, a gear wheel, or a member driven by gearing. These various types of pumping powers are well known in the art, and my invention is not limited to a particular construction of driving connections. The lower portion 13 includes one or more eccentrics, the power being transmitted to the pump through an eccentric strap such as shown at 17 in Fig. 1. These eccentrics are connected together and to the upper member 16 by bolts 19 or the like. Shear keys 18 are provided to align the parts when in assembled relation. In the embodiment shown, two eccentrics are provided, but it is obvious that a greater or less number may be used if desired.

In order to supply lubricant to the bearing surfaces on the eccentrics so as to lubricate the eccentric straps, I provide conduits which move with the rotatable member 14. One or more of these conduits is provided in accordance with the requirement for lubricating the various moving parts; and in the present embodiment I have shown two such conduits, one of the same being numbered 20 and leading to the bearing surface of the upper eccentric, and the other being numbered 21 and leading to the bearing surface on the lower eccentric. Since the entire member 14, as well as the conduits 20 and 21 rotate together, the exact arrangement of these conduits need not be in accordance with the particular showing in the drawings. The lubricant supplied to the bushings 12 and 15 and to the eccentrics makes its way by gravity downwardly so that it may be collected in a sump 22. The lubricant from the bushing 15 flows down along the bearing member 6 to the bushing 12, and from this bushing it passes into the thrust bearing 23 from which the excess passes into the sump 22. This sump 22 is protected by a cap 24 which excludes dirt and other foreign matter. The lubricant supplied to the upper strap 17 is caught by an upturned flange 26 formed on the eccentric which this strap surrounds. This flange collects the lubricant draining from this bearing, and a pipe or similar conduit 27 drains the oil from this sump into the sump 22. In a similar manner, a flange 28 collects the oil supplied to the lower strap 17; and a short pipe 29 delivers oil accumulating in this sump to the sump 22. From the sump 22 a conduit 30 returns the lubricant to the lubricator so that it may be recirculated to the pumping power.

I have provided improved connections between the conduits 9 and 10 and the conduits 21 and 20. It will be noted that the conduits 20 and 21 move with the rotatable member 14. As shown in Fig. 2, a manifold 31 is fastened by screws to the top of the bearing member 6. A short nipple 32 is threaded into the upper end of this manifold and supports a globe-shaped member 33 forming part of a universal joint between the conduits 9 and 21. A pipe 34 extends vertically from within the manifold 31 to a second universal joint 35 similar in construction to the lower universal joint. This pipe 34 passes through the nipple 32, space being left between the pipe and the nipple so that lubricant will flow upwardly from a chamber 36 in the manifold 31 to the chamber within the globe-shaped member 33. The pipe 34 is in communication with a chamber 37 in the manifold 31 which is connected to the conduit 10. The conduit 9 is connected to the chamber 36 in the manifold 31; and it is, therefore, apparent that oil or other lubricant forced upwardly through the conduits 9 and 10 will flow concentrically but by separate paths. A clamping member 39 is threaded on the upper rim of the globe-shaped member 33, and carries a packing ring 40 which permits universal movement of the globe-shaped member 33 relative to the upper portion of the universal joint. This upper portion 41 is threaded to the lower end of a T-shaped member 42. The upper portion 41 includes a globe-shaped lower flange 43 cooperating with the packing ring 40 to enclose the chamber surrounded by the globe-shaped member 33. Within the upper portion 41 is a washer 44 against which bears a spring 45 for urging the upper portion 41 and the T-shaped member 42 upwardly so that the globe-shaped flange 43 shall be pressed against the packing ring 40. The upper end of the T-shaped member 42 is formed as a stuffing box 47 which prevents leakage of lubricant along the pipe 34. A nipple 48 extends radially from the member 42 and is connected to the conduit 21.

In order to prime the lubricating means for the pumping power, I connect a third extension 49 to the conduit 21 and provide an upward extension from an elbow 51 of the conduit 20, so that lubricant may be introduced into the conduits 20 and 21 to prime the lubricating system.

The operation of my improved lubricating means is entirely independent of the rotation of the pumping power. Lubricant is forced upwardly through the conduits 7, 8, 9 and 10, this lubricant being delivered by the conduits 7 and 8 directly to the bushings 12 and 15.

The manifold 31, the nipple 32 and the globe-shaped member 33, as well as the vertical pipe 34 are all stationary. Lubricant flows upwardly through these parts, the lubricant passing through the pipe 34 being delivered to the conduit 20. The lubricant delivered to the universal joint, which includes the members 33 and 39, passes into the T-shaped member 42 which rotates with the rotatable member 14. The nipple 48 delivers this lubricant to the conduit 21. It will be understood that the upper universal joint 35 is similar in construction to the lower universal joint with the exception that the conduit 20 is connected directly to the upper portion of the universal joint.

The lubricant delivered to the different rotating parts of the power is delivered by gravity to the sump 22, and from this sump it is returned to the lubricator so that it may be again circulated to the pumping power.

The lubricant may have drained out of the system if the pumping power has been left idle for a considerable length of time. In such case, the removable plugs 50 are taken out, and lubricant is introduced through the priming means 49 and 51, so that the lubricator may operate to pump lubricant through the system.

It will be apparent that I have provided lubricating means which may be adjusted or repaired without shutting down the pumping power. It will furthermore be apparent that lubricant is delivered by means of a force feed pump to the moving parts of the pumping power. It will furthermore be apparent that I have provided an economical arrangement for lubricating the moving parts of the power since the lubricant forced under pressure to the bearings is collected in a sump and returned to the lubricator.

While I have illustrated and described one specific form of pumping power, it will be understood that the invention is not restricted to the particular construction and arrangement shown, but may be variously modified within the contemplation of the invention and under the scope of the following claims.

I claim:

1. In a pumping power, a stationary bearing member, a rotatable member journalled on said bearing member provided with a conduit for supplying lubricant to a bearing surface, said bearing member being provided with a conduit for lubricant, and a universal joint connection between said conduits permitting relative rotation.

2. In a pumping power, a bearing member provided with a plurality of conduits, a rotatable member journalled on said bearing member, said rotatable member being provided with a plurality of conduits for conveying lubricant to bearing surfaces on the rotatable member, and a plurality of coaxial connections for independently connecting conduits provided by the rotatable member with cooperating conduits provided by said bearing member.

3. In a pumping power, a stationary bearing member provided with a lubricant supply conduit, a rotatable member journalled on said bearing member provided with a conduit for supplying lubricant to a bearing surface, and universal joint means for placing said conduits in communication for the flow of lubricant to said bearing surface.

4. In a pumping power, a stationary bearing member having a conduit for supplying lubricant, a rotatable member journalled on said bearing member, said rotatable member having a conduit for supplying lubricant to a bearing surface, and a universal joint between said conduits.

5. In a pumping power, a bearing member, a rotatable member journalled on said bearing member, means for lubricating bearing surfaces on the rotatable member including a plurality of pairs of conduits, one conduit of each pair being stationary and the other conduit moving with said rotatable member, and coaxial connections for independently connecting the pairs of conduits.

6. In a pumping power, a bearing member, a rotatable member journalled on said bearing member, and means for lubricating bearing surfaces on the rotatable member including a plurality of pairs of conduits, one conduit of each pair being stationary and the other conduit moving with said rotatable member, and coaxial connections for independently connecting the pairs of conduits, one of said connections including a stuffing box for permitting relative rotation between parts of said connections.

7. In a pumping power, a bearing member, a rotatable member journalled on said bearing member, and means for lubricating bearing surfaces on the rotatable member including a plurality of pairs of conduits, one conduit of each pair being stationary and the other conduit moving with said rotatable member, coaxial connections for independently connecting the pairs of conduits and a removable casing protecting said coaxial connections.

8. In a pumping power, a bearing member, a rotatable member journalled on said bearing member, and means for lubricating bearing surfaces on the rotatable member including a pair of conduits, one of which is stationary and the other of which moves with said rotatable member, means for placing said conduits in communication for the flow of lubricant to said bearing surfaces, and a connection in one of said conduits for priming said lubricating means.

9. In a pumping power, a bearing member, a rotatable member journalled on said bearing member, and means for lubricating bearing surfaces on the rotatable member including a plurality of pairs of conduits, one conduit of each pair being stationary and the other conduit moving with said rotatable member, coaxial connections for independently connecting the pairs of conduits, and a priming element connected in one conduit of each pair for priming said lubricating means.

In testimony whereof I have hereunto set my hand.

EDGAR E. GREVE.